US009495028B2

(12) United States Patent
Chiu et al.

(10) Patent No.: US 9,495,028 B2
(45) Date of Patent: Nov. 15, 2016

(54) METHOD FOR FORMING TOUCH PANEL (71) Applicant: TPK Touch Solutions (Xiamen) Inc., Xiamen (CN)

(72) Inventors: Tsung-Ke Chiu, Tainan (TW); Shunqing Su, Putian (CN); Zhuanyuan Zhang, Zhangzhou (CN); Yan Lin, Xiamen (CN)

(73) Assignee: TPK Touch Solutions (Xiamen) Inc., Xiamen (CN)

( * ) Notice: Subject to any disclaimer, the term of this patent is extended or adjusted under 35 U.S.C. 154(b) by 29 days.

(21) Appl. No.: 14/191,453

(22) Filed: Feb. 27, 2014

(65) Prior Publication Data

US 2014/0240620 A1 Aug. 28, 2014

(30) Foreign Application Priority Data

Feb. 27, 2013 (CN) .......................... 2013 1 0061067

(51) Int. Cl.
G06F 3/041 (2006.01)
G06F 1/16 (2006.01)
G06F 3/044 (2006.01)

(52) U.S. Cl.
CPC ............. G06F 3/041 (2013.01); G06F 1/1626 (2013.01); G06F 1/1643 (2013.01); G06F 3/044 (2013.01); G06F 2203/04111 (2013.01)

(58) Field of Classification Search
CPC .... G06F 3/041; G06F 1/1626; G06F 1/1643; G06F 2203/04111; H05K 1/0298; H05K 1/115; H05K 1/0274; H05K 3/465; H05K 3/368; Y10T 29/49155
See application file for complete search history.

(56) References Cited

U.S. PATENT DOCUMENTS

| 2012/0023719 A1* | 2/2012 | Huang .................. C23C 14/086 29/25.35 |
| 2013/0043068 A1* | 2/2013 | Xie .......................... G06F 3/044 174/262 |

FOREIGN PATENT DOCUMENTS

| EP | 2369453 A2 * | 9/2011 | ............. G06F 3/041 |
| JP | 2011-554341 * | 9/2011 | ............. G06F 3/041 |

* cited by examiner

Primary Examiner — Peter DungBa Vo
Assistant Examiner — Jeffrey T Carley
(74) Attorney, Agent, or Firm — Paul Bendemire (57) ABSTRACT The present invention provides a method for forming a touch panel, at least comprising the following steps. Step S1: a patterned first electrode layer is formed on a cover lens. A display region and a non-display region are defined on the cover lens, and the patterned first electrode layer is formed within the display region; step S2: a shielding layer is formed on the cover lens and disposed within the non-display region; step S3: an insulating layer is then formed on the shielding layer and on the patterned first electrode layer, a plurality of via holes are formed on the insulating layer, thereby exposing parts of the patterned first electrode layer; and step S4: a patterned second electrode layer is formed on the insulating layer within the non-display region, and the patterned second electrode layer is electrically connected to the patterned first electrode layer through the via holes.

11 Claims, 8 Drawing Sheets

METHOD FOR FORMING TOUCH PANEL

BACKGROUND OF THE INVENTION

The present invention claims the priority of China Patent Application No. 201310061067.1 filed on Feb. 27, 2013, which is incorporated by reference in the present application in its entirety.

1. Field of the Invention

The present invention relates to the field of touch input technologies and more particularly to a touch panel and a manufacturing method thereof.

2. Description of the Prior Art

Nowadays, personal digital assistants (PDA), mobile phones, notebook computers, tablet PCs and other portable electronic products are wildly used in modern life.

In conventional touch on lens (TOL) processes, the sensing electrode layers are directly formed on the cover lens, wherein the cover lens comprises a display region and a non-display region, and the cover lens is usually made of glass materials. Generally, there are two methods for forming a TOL structure. In the first method a shielding layer is formed on the cover lens within the display region, and the sensing electrode layer (usually made of indium tin oxide, ITO) is then formed through a sputter process. Since the temperature of the sputter process is high (about 330° C.), the shielding layer tends to be easily damaged.

In order to avoid the damages of the shielding layer, in another method for forming the TOL structure, the sensing electrode layer is formed first, and the shielding layer is then formed on the cover lens within the non-display region. To ensure that the touch function is available within the non-display region, the sensing electrode layer can expand to the non-display region. However, the sensing electrode layer is disposed between the cover lens and the shielding layer and the sensing electrode layer is visible to the user, especially in bright light mode. To resolve this issue, the size of the sensing electrode layer needs to be controlled within the display region. But, in this way, the touch panel will lost the touch function feature within the non-display region.

Therefore, a novel touch panel is needed to resolve the issues mentioned above.

BRIEF SUMMARY OF THE INVENTION

The present invention provides a method for forming a touch panel, at least comprising the following steps. Step S1: a patterned first electrode layer is formed on a cover lens. A display region and a non-display region are defined on the cover lens, and the patterned first electrode layer is formed within the display region. Step S2: a shielding layer is formed on the cover lens and disposed within the non-display region. Step S3: an insulating layer is formed on the shielding layer and on the patterned first electrode layer, a plurality of via holes are formed on the insulating layer, thereby exposing parts of the patterned first electrode layer. Step S4: a patterned second electrode layer is formed on the insulating layer within the non-display region, and the patterned second electrode layer is electrically connected to the patterned first electrode layer through the via hole.

The present invention provides a touch panel, comprising: a cover lens, defining a display region and a non-display region on the cover lens, a shielding layer disposed on the cover lens and within the non-display region, an insulating layer disposed on the shielding layer and on the patterned first electrode layer, a plurality of via holes are disposed on the insulating layer exposing parts of the patterned first electrode layer, and a patterned second electrode layer disposed on the insulating layer within the non-display region, wherein the patterned second electrode layer is electrically connected to the patterned first electrode layer through the via hole.

In the touch panel of this invention, the patterned sensing electrode layer within the display region and within the non-display region are formed during different steps, and disposed on different levels. Since the patterned sensing electrode layer within the display region is formed first, and the shielding layer is formed thereafter, the shielding layer less likely to be damaged. Besides, a patterned sensing electrode layer within the non-display region is also formed, so the touch panel of the present invention can provide a touch function in the non-display region.

These and other objectives of the present invention will no doubt become obvious to those of ordinary skill in the art after reading the following detailed description of the preferred embodiment that is illustrated in the various figures and drawings.

DETAILED DESCRIPTION OF INVENTION

To provide a better understanding of the present invention to users skilled in the technology of the present invention, preferred embodiments are detailed as follows. The preferred embodiments of the present invention are illustrated in the accompanying drawings with numbered elements to clarify the contents and effects to be achieved.

Please note that the figures are only for illustration and the figures may not be to scale. The scale may be further modified according to different design considerations. When referring to the words "up" or "down" that describe the relationship between components in the text, it is well known in the art and should be clearly understood that these words refer to relative positions that can be inverted to obtain a similar structure, and these structures should therefore not be precluded from the scope of the claims in the present invention.

Figure 1:
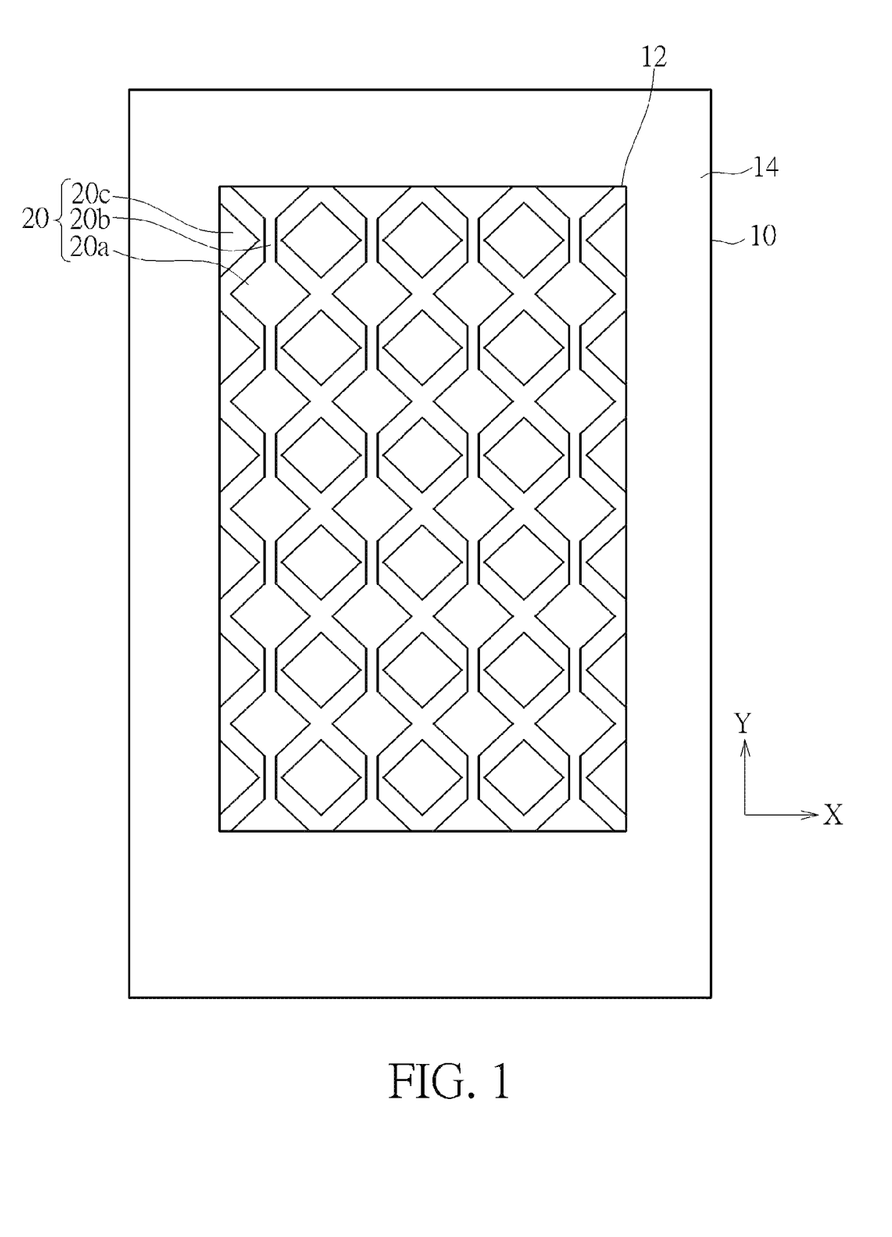
FIGS. 1~5 are top-view diagrams showing a touch panel according to the first preferred embodiment of the present invention.

Please refer to FIG. 1~5. FIGS. 1~5 are top-view diagrams showing a touch panel according to the first preferred embodiment of the present invention. As shown in FIG. 1, first, a cover lens 10 is provided, and then a display region 12 and a non-display region 14 surrounding the display region 12 are defined on the cover lens 10. The cover lens 10 is made of different types of transparent materials, not limited to rigid materials or flexible materials types, like glass, polycarbonate (PC), polyethylene terephthalate (PET), polymethylmesacrylate (PMMA), polysulfone (PES) or others cyclic olefin copolymer.

Afterwards, a patterned first electrode layer 20 is formed on the cover lens 10, and is disposed within the display region 12. In this embodiment, the patterned first electrode layer 20 comprises a plurality of first blocks 20a arranged along a first direction (for example, the Y-axis), a plurality of connection traces 20b electrically connected to the adjacent first blocks 20a, a plurality of second blocks 20c arranged along a second direction (for example, the X-axis), wherein the second blocks 20c are disposed on two sides of the connection traces 20b. In this step, the second blocks 20c are not connected to each other, and a continuous electrode is not complete yet. The second blocks 20c can be later connected together to complete the electrode, which procedures are well known to persons of ordinary skills in the art and the details will not be described here. Besides, the patterned first electrode layer 20 is made of indium tin oxide (ITO), nano silver, carbon nano tube (CNT) and other conductive transparent materials, but not limited thereto. In this embodiment, the patterned first electrode layer 20 is formed within the display region 12 through sputtering, electroplating, printing, spin coating or other methods. It is worth noting that if ITO is used as the material of the patterned first electrode layer 20, the temperature of the sputtering process is between 300° C.~360° C., so the ITO electrode will have better transparency, and the light will not be shaded by the ITO electrode easily, which is suitable for the electrode pattern within the display region 12.

Figure 2:
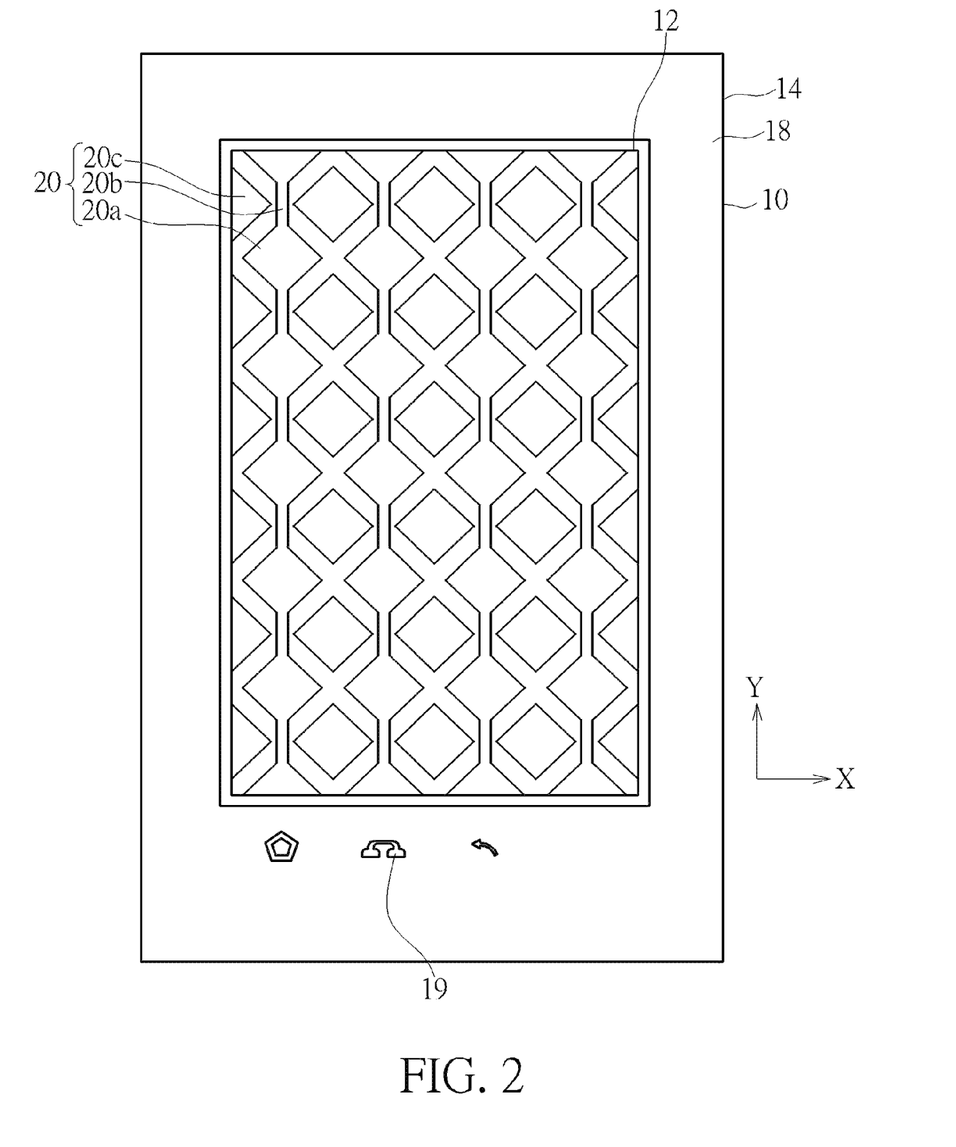

As shown in FIG. 2, a shielding layer 18 is formed on the cover lens, and is disposed within the non-display region 14. The shielding layer 18 selectively comprises at least one hollow pattern 19 (i.e. the bottom pattern or the trademark of the touch panel). In another embodiment, a color layer can be formed on the hollow pattern 19 to provide the color bottom or the color trademark. In this embodiment, the shielding layer 18 is made of color photoresist (such as black photoresist), color ink or other opaque materials; these materials are easily damaged at high temperature. Therefore, in this embodiment, the shielding layer 18 is preferably formed after the patterned first electrode layer 20 is formed, so as to avoid the shielding layer 18 from being damaged by high temperature during the formation of the patterned first electrode layer 20. The shielding layer 18 can be formed through a lithography process or a printing process, but it is not limited thereto. It is worth noting that, in this embodiment, the shielding layer 18 does not cover the patterned first electrode layer 20, and there is a small gap between the display region 12 and the shielding layer 18.

Figure 3:
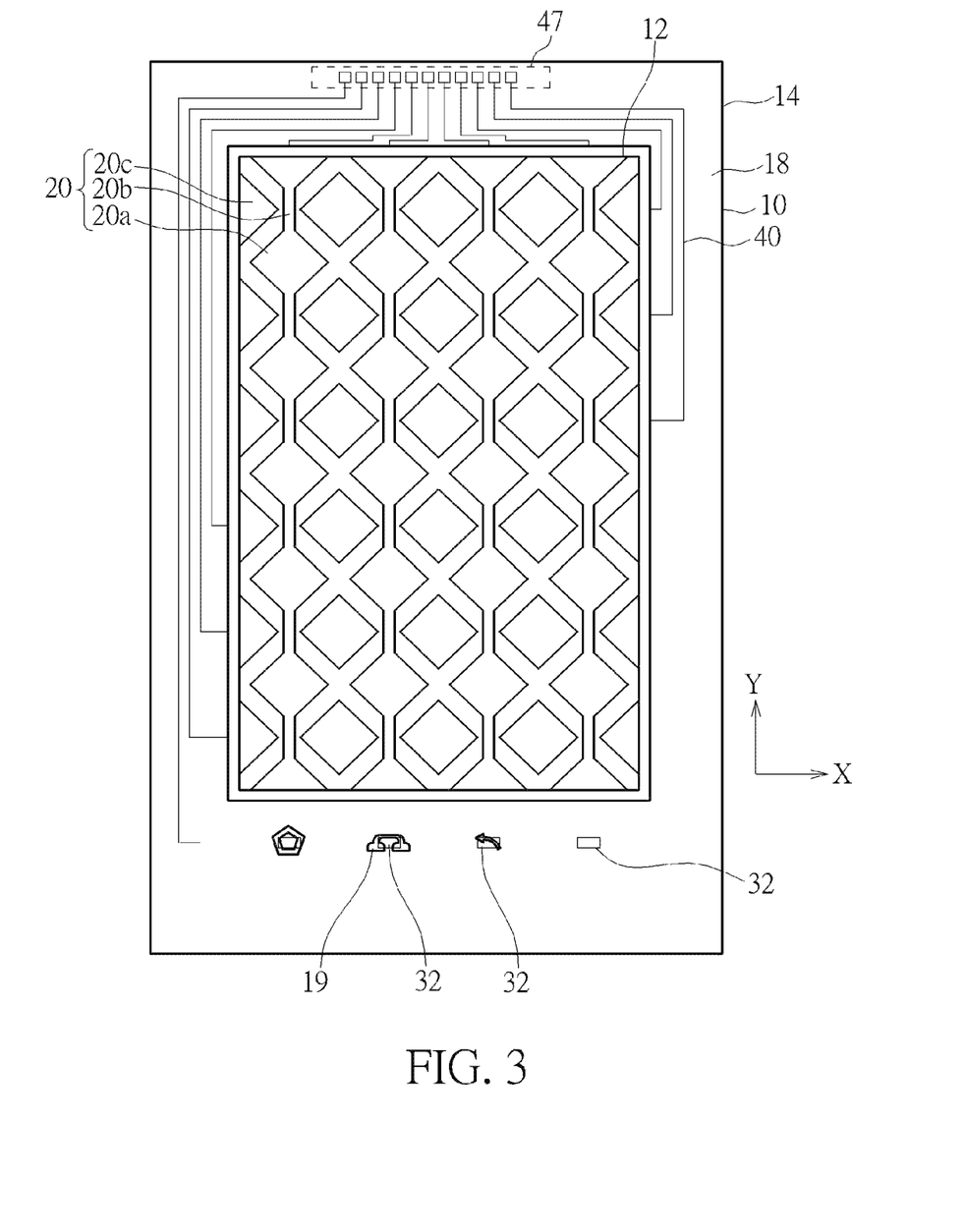

In this embodiment, after the shielding layer 18 is formed, as shown in FIG. 3, a plurality of signal traces 40 is formed on the shielding layer 18. In addition, a plurality of second jumpers 32 is formed on the shielding layer 18, wherein the second jumpers 32 are disposed within the non-display region 14. Preferably, the signal traces 40 and the second jumpers 32 disposed on the shielding layer 18 are formed simultaneously and are made of a same material, such as metal (silver, copper, aluminum, molybdenum . . . ), transparent conductive material (such as ITO, or a combination thereof. Besides, the end of the signal traces 40 are collected to a trace collection region 47 that conveniently connects them to an external controller (not shown) in the following steps. The amount and the size of the trace collection region 47 can be adjusted according to the shapes of the signal traces 40 and the patterned first electrode layer 20, and are not limited to the amount shown in the figure. It is worth noting that each signal trace 40 is not electrically connected to the patterned first electrode layer 20 in this step, and there is a gap in between, in order to prevent visible defects within the display region 12 when the signal traces 40 are made of opaque materials.

Figure 4:
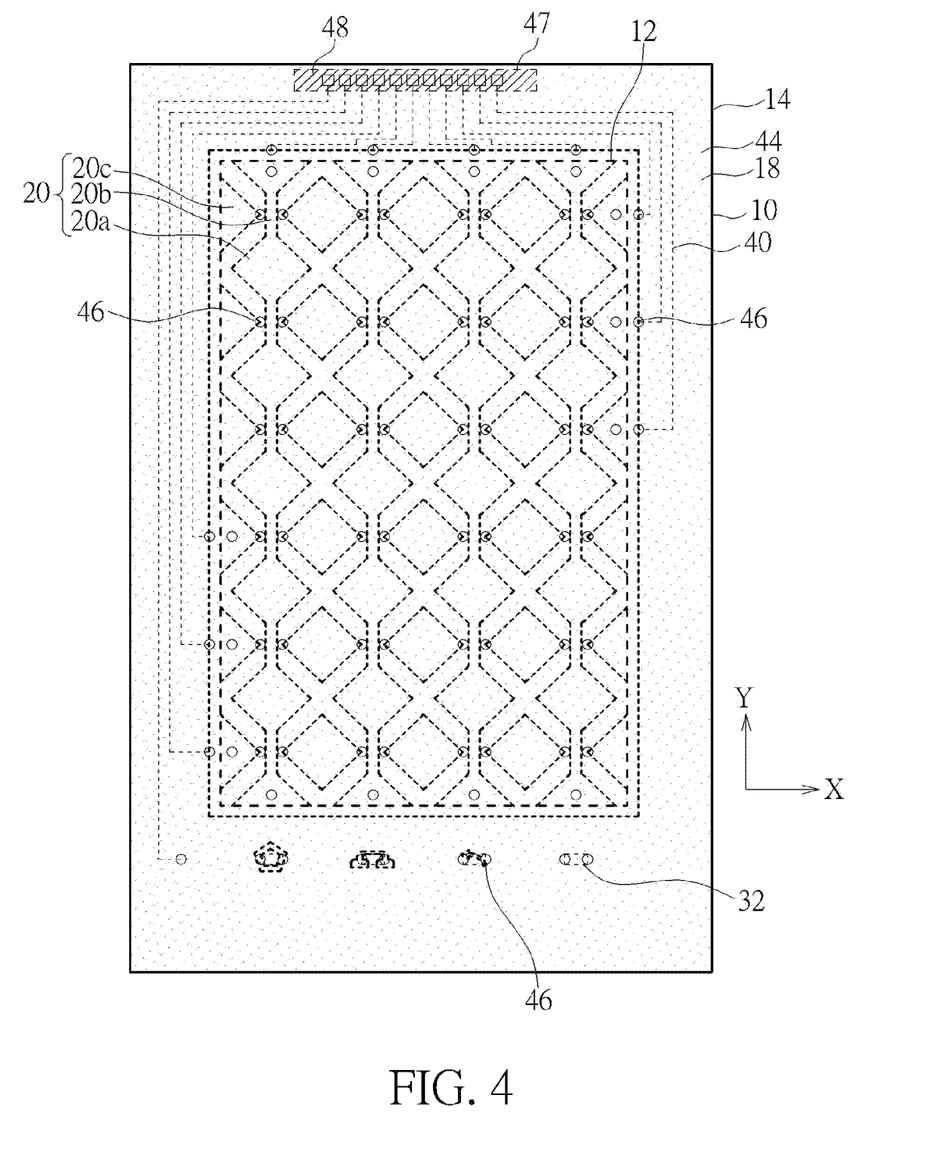

As shown in FIG. 4, an insulating layer 44 is formed on the shielding layer 18 and on the patterned first electrode layer 20; a plurality of via holes 46 is formed on the insulating layer 44, thereby exposing parts of the patterned first electrode layer 20. In this embodiment, the via holes 46 expose parts of the signal traces 40 and parts of the second jumpers 32. The other components formed on the insulating layer 44 can be electrically connected to the signal traces 40, to the patterned first electrode layer 20 or to the second jumpers 32 through the via holes 46, so as to electrically connected them respectively or electrically connected them to each other. Besides, each signal trace 40 within the trace collection region 47 needs to be electrically connected to the external controller in the following steps. In this embodiment, before the insulating layer 44 is formed, a peelable glue 48 can be formed on the trace collection region 47, in order to protect the signal traces 40 within the trace collection region 47, wherein the peelable glue 48 can be easily removed in the following process to expose the signal traces 40, and electrically connect them to the controller. In one embodiment of the present invention, the insulating layer 44 is made of polyimide (PI) or a photoresist layer, the photoresist layer can be formed to the shaped needed through a photo-etching process.

Figure 5:
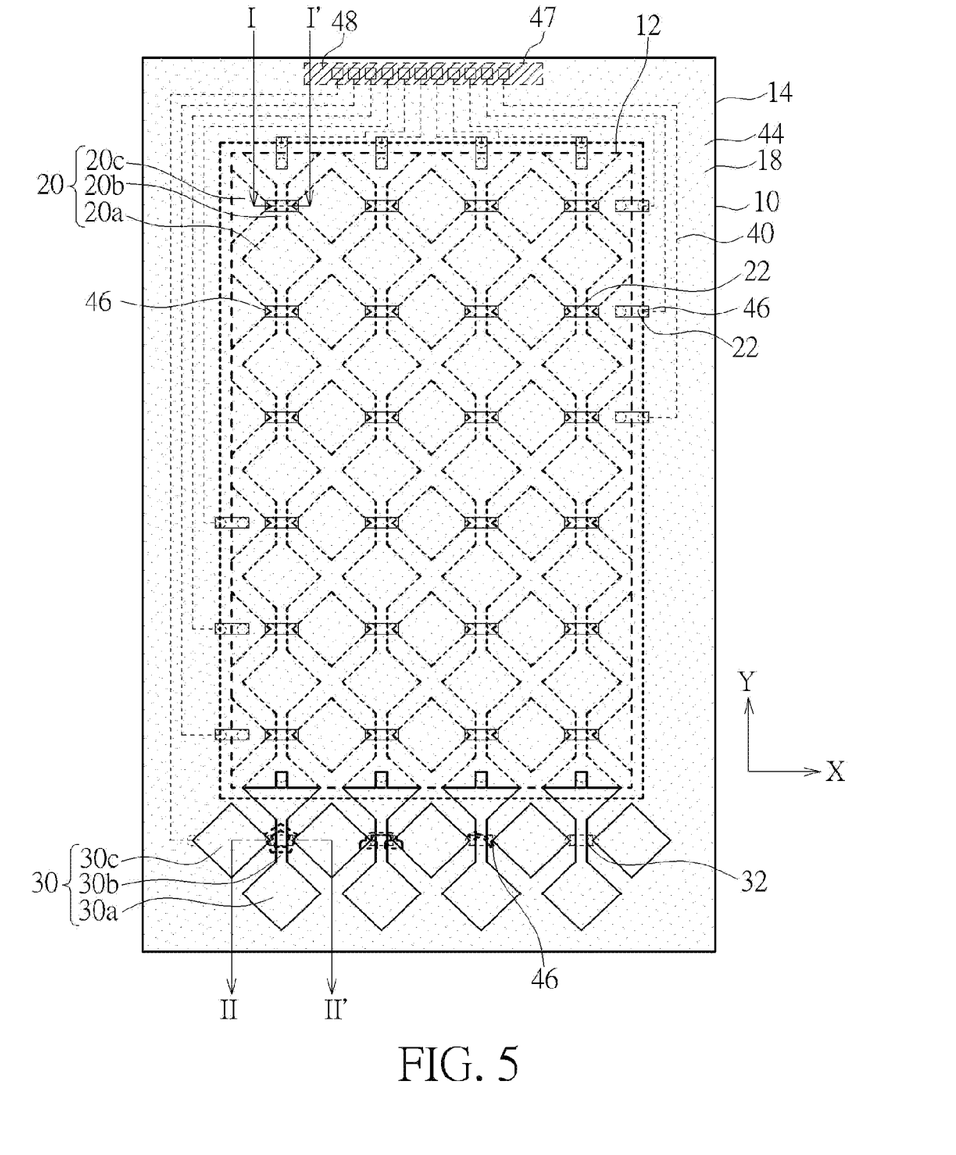

As shown in FIG. 5, after the insulating layer 44 is formed, a patterned second electrode layer 30 is formed on the insulating layer 44 within the non-display region 14. The patterned second electrode layer 30 is electrically connected to the patterned first electrode layer 20 through the via holes 46. Similarly to the patterned first electrode layer 20, in this embodiment, the patterned second electrode layer 30 comprises a plurality of first blocks 30a arranged along a first direction, a plurality of connection traces 30b electrically connected to two adjacent first blocks 30a, a plurality of second blocks 30c arranged along a second direction, wherein the second block 30c are disposed on two sides of the connection trace 30b, and the second jumpers 32 are electrically connected to the second block 30c through the via holes 46.

In this embodiment, as shown in FIG. 5, after the insulating layer 44 is formed, a plurality of first jumpers 22 is formed on the insulating layer 44, wherein the first jumpers 22 are electrically connected to the signal traces 40 and the patterned first electrode layer 20 through the via holes 46. In another way, the first jumpers 22 are electrically connected to two adjacent second blocks 20c through the via holes 46.

Preferably, the patterned second electrode layer 30 and the first jumpers 22 disposed on the insulating layer 44 are formed simultaneously, and made of the same material, such as indium tin oxide (ITO), nano silver, carbon nano tube (CNT) and other conductive transparent materials. Since the first jumpers 22 are transparent, it will not affect the transparency within the display region 12.

In addition, after the electrode structure mentioned above is formed, a protection layer (not shown in FIG. 5) may entirely cover each component. In this embodiment, the protection layer is made of silicon nitride, silicon oxide or any other transparent material, after the protection layer is formed, the peelable glue 48 is peeled, which exposes the signal traces 40 within the trace collection region 47, thereby allowing the signal traces 40 to be electrically connected to the controller. In another embodiment, if the protection layer is made of polyimide (PI) or others transparent photoresist layers, the signal traces 40 within the trace collection region 47 can be exposed through etching the protection layer. In other words, if both the protection layer and the insulating layer 44 are made of photoresist materials, the step for forming the peelable glue 48 can be skipped.

Figure 6:
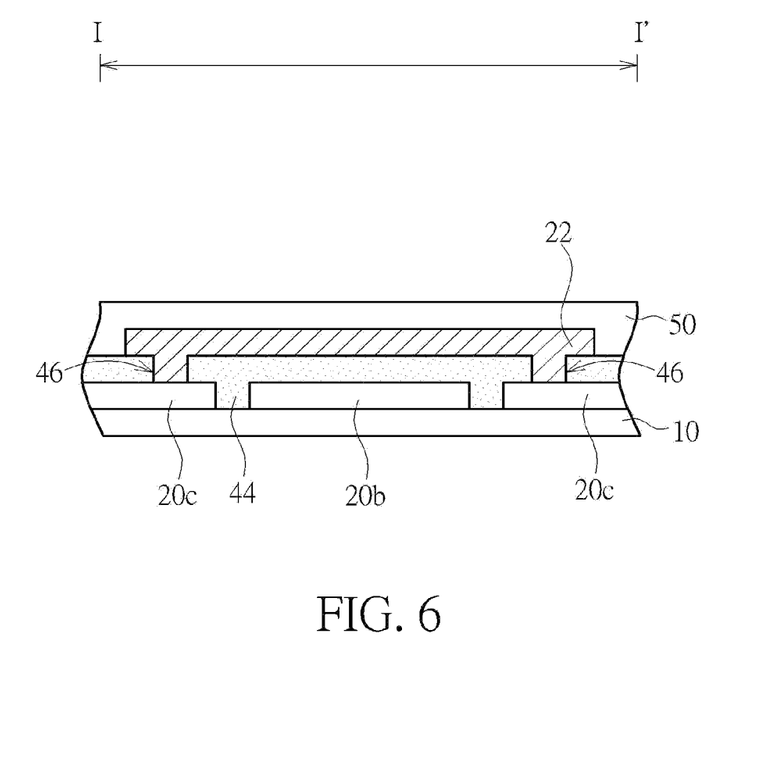
FIG. 6 is a cross-sectional diagram showing the touch panel along the cross-line I-I' of FIG. 5.
Figure 7:
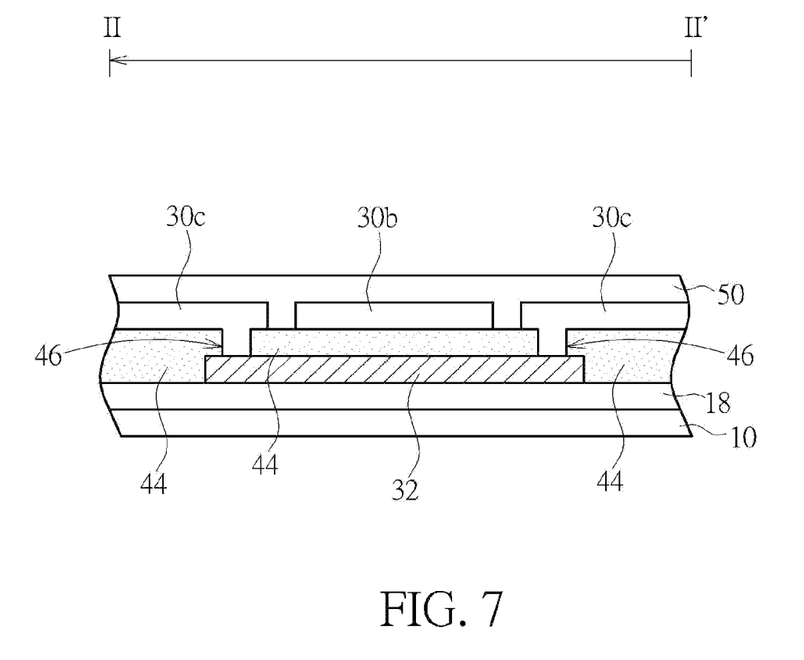
FIG. 7 is a cross-sectional diagram showing the touch panel along the cross-line II-II' of FIG. 5.

FIG. 6~7 are cross-sectional diagrams respectively showing the touch panel along the cross-line I-I' and along the cross line of FIG. 5. Please refer to FIGS. 5~6; within the display region 12, the first jumper 22 are electrically connected to the patterned first electrode layer 20 through the via holes 46, and connect the second block 20c arranged along the second direction together. Since the insulating layer 44 is disposed on the intersection between the connection traces 20b and the first jumpers 22, it can electrically isolate the connection traces 20b from the first jumpers 22. Besides, parts of the first jumpers 22 are disposed on the junction of the display region 12 and the non-display region 14, so as to electrically connect the signal traces 40 to the patterned first electrode layer 20.

Please refer to FIG. 5 and FIG. 7; within the non-display region 14, the patterned second electrode layer 30 is electrically connected to each second jumper 32 through the via holes 46. Besides, the patterned second electrode layer 30 is electrically connected to the patterned first electrode layer 20 through the via holes 46. Since the insulating layer 44 is disposed at the intersection between the connection traces 30b and the first jumpers 32, it can therefore electrically isolate the connection traces 30b from the first jumpers 32. The patterned second electrode layer 30 is disposed correspondingly to parts of the hollow pattern 19 (e.g., FIG. 2). In other words, when the hollow pattern 19 is a bottom structure of the touch panel, the patterned second electrode layer 30 provides the touch function for the bottom structure of the touch panel. It is worth noting that, in this embodiment, the first jumpers 22 and the patterned second electrode layer 30 are preferably formed during the same step, and are made of the same material, such as indium tin oxide (ITO), nano silver, carbon nano tube (CNT) and other conductive transparent material. Take ITO as an example, it is formed at ambient temperature around 20° C.~30° C.; such low temperature (20° C.~30° C.) will not damage the shielding layer 18, therefore, even though the patterned second electrode layer 30 is formed after the shielding layer 18 is formed, the shielding layer 18 will not be damaged. Finally, a protection layer 50 is deposited to cover each component, in order to protect each component from physical or chemical damages.

Figure 8:
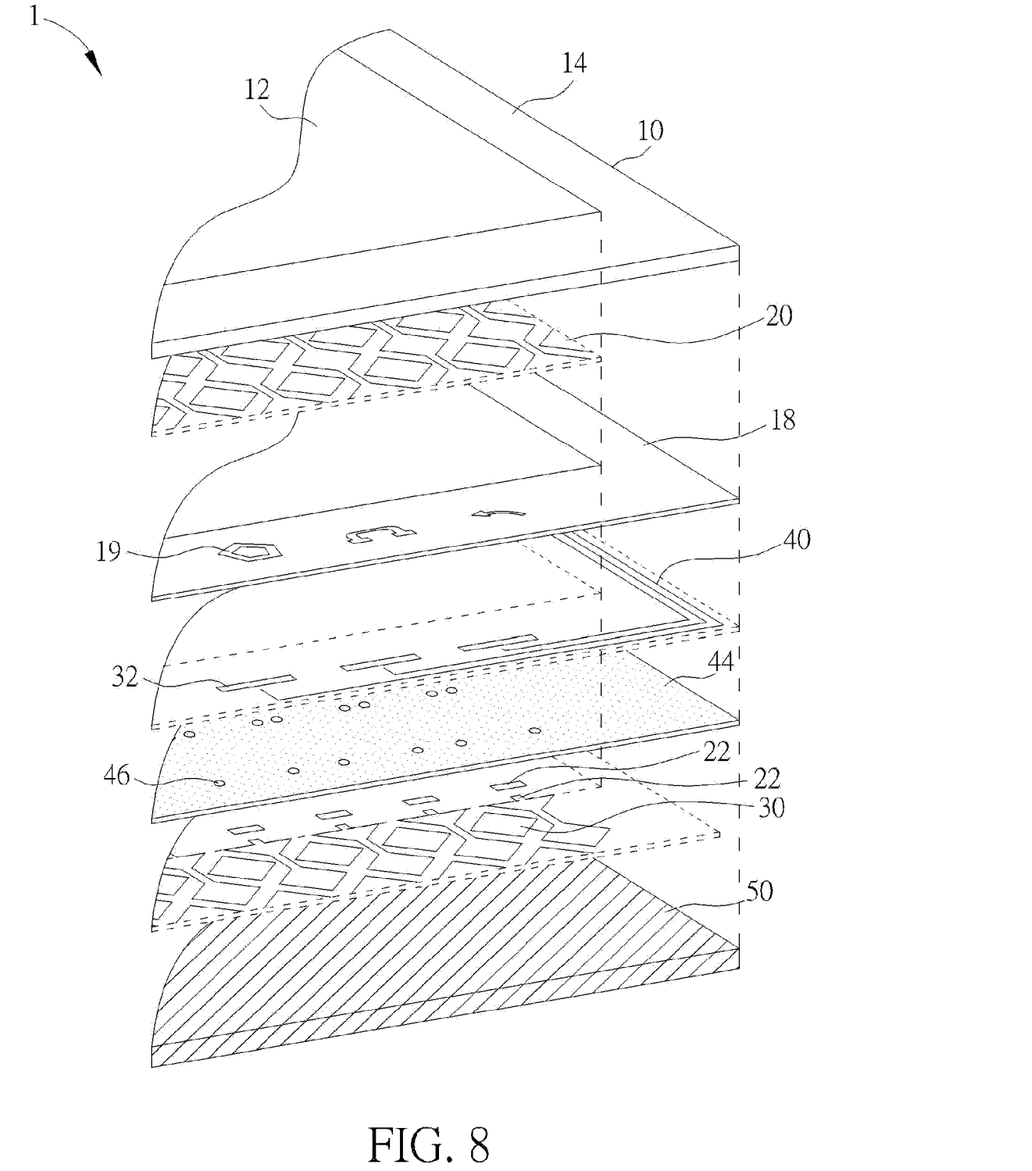
FIG. 8 is a diagram showing the partial touch panel structure of the present invention.

Please refer to FIG. 5 and FIG. 8, to better understand the touch panel of the present invention. FIG. 8 shows a partial touch panel structure of the present invention; the touch panel 1 comprises a cover lens 10, wherein the cover lens 10 includes a display region 12 and a non-display region 14 surrounding the display region 12, a patterned first electrode layer 20 disposed on the cover lens 10 and disposed within the display region 12, a shielding layer 18 disposed on the cover lens 10 and disposed within the non-display region 14, an insulating layer 44 disposed on the shielding layer 18 and on the patterned first electrode layer 20, wherein the insulating layer 44 has a plurality of via holes 46 and the via holes 46 expose parts of the patterned first electrode layer 20, and a patterned second electrode layer 30 disposed on the insulating layer 44 within the non-display region 14, wherein the patterned second electrode layer 30 is electrically connected to the patterned first electrode layer 20 through the via holes 46.

In this embodiment, the shielding layer 18 further comprises at least one hollow pattern 19.

In this embodiment, the touch panel further comprises a plurality of signal traces 40 disposed on the shielding layer 18 and between the shielding layer 18 and the insulating layer 44, a plurality of first jumpers 22 disposed on the insulating layer 44, wherein the first jumpers 22 are electrically connected to the signal traces 40 and the patterned first electrode layer 20 through the via holes 46. The end of each signal trace 40 is collected at a trace collection region 47.

In this embodiment, the patterned first electrode layer 20 comprises a plurality of first blocks 20a arranged along a first direction, a plurality of connection traces 20b electrically connected to two adjacent first blocks 20a, a plurality of second blocks 20c arranged along a second direction, wherein the second blocks 20c are disposed on two sides of the connection traces 20b, and the first jumpers 22 disposed on the insulating layer 44 are electrically connected to the adjacent second blocks 20c through the via holes 46.

In this embodiment, the first jumpers 22 and the patterned second electrode layer 30 are made of transparent conductive material, such as indium tin oxide (ITO), nano silver, carbon nano tube (CNT) and other conductive transparent materials.

In this embodiment, the touch panel 1 further comprises a plurality of second jumpers 32 disposed on the shielding layer 18 and between the shielding layer 18 and the insulating layer 44. The patterned second electrode layer 30 comprises a plurality of first blocks 30a arranged along a first direction, a plurality of connection traces 30b electrically connected to two adjacent first blocks 30a, a plurality of second blocks 30c arranged along a second direction, wherein the second block 30c are disposed on two sides of the connection traces 30b, and the second jumpers 32 disposed on the shielding layer 18 are electrically connected to the adjacent second blocks 30c through the via holes 46.

In this embodiment, the second jumpers 32 and the signal traces 40 on the shielding layer 18 are preferably made of the same material, such as metal (silver, copper, aluminum, molybdenum . . . ), transparent conductive material (such as ITO) or a combination thereof.

In this embodiment, the touch panel 1 further comprises a protection layer 50, covers the patterned second electrode layer 30 and the insulating layer 44. It is worth noting that the signal traces 40 within the trace collection region 47 are not covered by the insulating layer 44 and the protection layer 50, so as to allow the signal traces 40 to be electrically connected to the controller.

The other components, material properties, and manufacturing method of the touch panel 1 are similar to those of the description detailed above and are not repeated herein.

In summary, the present provides a touch panel and the manufacturing process thereof, comprising a sensing electrode layer within the display region and within the non-display region that are formed in different steps. In detail, the sensing electrode layer within the display region is formed before the shielding layer is formed, and the sensing electrode layer within the non-display region is formed through a low-temperature process, therefore the shielding layer within the non-display region will not be damaged by high-temperature. The second jumpers and the signals traces can also be formed simultaneously, and the sensing electrode layer within the non-display region and the first jumpers can be formed simultaneously too, thereby simplifying the manufacturing process.

Those skilled in the art will readily observe that numerous modifications and alterations of the device and method may be made while retaining the teachings of the invention. Accordingly, the above disclosure should, be construed as limited only by the metes and bounds of the appended claims.

What is claimed is:

1. A method for forming a touch panel, at least comprising the following steps:

S1: forming a patterned first electrode layer on a cover lens, wherein the patterned first electrode layer defines a display region on the cover lens and a non-display region, surrounding the display region, on the cover lens;

S2: forming a shielding layer on the cover lens and forming a plurality of signal traces and a plurality of second jumpers on the shielding layer, wherein the shielding layer is disposed within the non-display region;

S3: forming an insulating layer on the shielding layer and on the patterned first electrode layer, and forming a plurality of via holes on the insulating layer, wherein a first via hole of the plurality of via holes exposes at least some of the patterned first electrode layer; and S4: forming a patterned second electrode layer on the insulating layer within the non-display region and forming a plurality of first jumpers on the insulating layer, wherein the patterned second electrode layer is electrically connected to the patterned first electrode layer through at least some of the plurality of via holes, wherein a second via hole of the plurality of via holes exposes at least some of the signal traces and a third via hole of the plurality of via holes exposes at least some of the plurality of second jumpers, wherein a second jumper of the plurality of second jumpers that is exposed by the third via hole is operatively coupled to at least some of the patterned second electrode layer, wherein a first jumper of the plurality of first jumpers is electrically connected to at least some of the signal traces through a fourth via hole of the plurality of via holes and a second jumper of the plurality of first jumpers is electrically connected to at least some of the patterned first electrode layer through a fifth via hole of the plurality of via holes, and wherein the patterned second electrode layer comprises:

a plurality of first blocks arranged along a first direction;

a plurality of connection traces electrically connected to two adjacent first blocks; and a plurality of second blocks arranged along a second direction, disposed on two sides of the plurality of connection traces, and at least some of the second jumpers on the shielding layer are electrically connected to at least some of adjacent second blocks through at least some of the via holes.

2. The method of claim 1, wherein the patterned first electrode layer formed in step S1 comprises:

a plurality of first blocks arranged along a first direction;

a plurality of connection traces electrically connected to two adjacent first blocks; and a plurality of second blocks arranged along a second direction, disposed on two sides of the plurality of connection traces, and electrically connected to at least some of the first jumpers through at least some of the via holes.

3. The method of claims 1, wherein the plurality of first jumpers and the patterned second electrode layer are formed simultaneously, and are made of transparent materials.

4. The method of claim 1, wherein the plurality of second jumpers and the plurality of signal traces are formed simultaneously and are made of metals, transparent materials or a composition thereof.

5. The method of claim 1, wherein a temperature for forming the patterned first electrode layer in step S1 is between 300° C.~360° C.

6. The method of claim 1, wherein a temperature for forming the patterned second electrode layer in step S4 is between 20° C.~30° C.

7. The method of claim 1, wherein the patterned first electrode layer is made of conductive transparent material.

8. The method of claim 1, wherein in the step S2, the shielding layer is formed to comprise at least one hollow pattern corresponding to part of the patterned second electrode layer.

9. The method of claim 8, further comprising forming a color layer corresponding to the hollow pattern to provide a color bottom or a color trademark.

10. The method of claim 1, wherein the shielding layer is made of at least one of color photoresist, color ink or opaque material.

11. The method of claim 1, wherein the shielding layer is laterally spaced away from the patterned first electrode layer such that there is a gap between the patterned first electrode layer and the shielding layer.

* * * * *